(12) United States Patent
Yang et al.

(10) Patent No.: US 12,544,388 B2
(45) Date of Patent: Feb. 10, 2026

(54) COMPOUND FOR TREATING AND/OR PREVENTING DISEASES CAUSED BY CORONAVIRUS AND USE THEREOF

(71) Applicant: SHANGHAITECH UNIVERSITY, Shanghai (CN)

(72) Inventors: Haitao Yang, Shanghai (CN); Zhenming Jin, Shanghai (CN); Xiaoyu Du, Shanghai (CN); Yinkai Duan, Shanghai (CN); Yao Zhao, Shanghai (CN); Xiuna Yang, Shanghai (CN); Zihe Rao, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 680 days.

(21) Appl. No.: 17/924,802

(22) PCT Filed: Apr. 29, 2021

(86) PCT No.: PCT/CN2021/090916
§ 371 (c)(1),
(2) Date: Nov. 11, 2022

(87) PCT Pub. No.: WO2021/227887
PCT Pub. Date: Nov. 18, 2021

(65) Prior Publication Data
US 2023/0302019 A1  Sep. 28, 2023

(30) Foreign Application Priority Data
May 15, 2020 (WO) ............... PCT/CN2020/090534
May 18, 2020 (CN) ....................... 202010418069.1

(51) Int. Cl.
A61K 31/58   (2006.01)
A61K 31/497  (2006.01)

(52) U.S. Cl.
CPC ............ *A61K 31/58* (2013.01); *A61K 31/497* (2013.01)

(58) Field of Classification Search
CPC .... A61K 31/343; A61K 31/497; A61K 31/58; A61K 45/06; A61P 31/14
See application file for complete search history.

(56) References Cited

U.S. PATENT DOCUMENTS

2020/0061030 A1   2/2020  Sasikumar et al.

FOREIGN PATENT DOCUMENTS

| CN | 102552236 A | 7/2012 |
| CN | 103917228 A | 7/2014 |
| CN | 106798737 A | 6/2017 |
| CN | 109620816 A | 4/2019 |

(Continued)

OTHER PUBLICATIONS

Sep. 9, 2023 First Office Action issued in Chinese Application No. 202110472690.0.

(Continued)

*Primary Examiner* — Savitha M Rao
(74) *Attorney, Agent, or Firm* — Harness, Dickey & Pierce, P.L.C.

(57) ABSTRACT

Disclosed is compound YM155, tanshinone I or cryptotanshinone, or a pharmaceutically acceptable salt thereof, a solvate thereof, a solvate of the pharmaceutically acceptable salt thereof, or a crystal form thereof, for treating and/or preventing diseases caused by coronavirus.

8 Claims, 5 Drawing Sheets

Specification includes a Sequence Listing.

(56) References Cited

FOREIGN PATENT DOCUMENTS

| | | | |
|---|---|---|---|
| KR | 20130071032 A | 6/2013 | |
| WO | WO-2013148649 A1 * | 10/2013 | .............. A61P 35/00 |

OTHER PUBLICATIONS

Sep. 9, 2023 Search Report issued in Chinese Application No. 202110472690.0.
Mar. 9, 2024 Second Office Action issued in Chinese Application No. 202110472690.0.
May 14, 2024 Partial Search Report issued in European Application No. 21802901.5.
Aug. 5, 2024 Extended Search Report issued in European Application No. 21802901.5.
Dec. 13, 2024 First Office Action issued in Chinese Application No. 202180035384.9.
Dec. 13, 2024 First Search Report issued in Chinese Application No. 202180035384.9.
Yao Zhao et al., High-throughput screening identifies established drugs as SARS-CoV-2 PLpro inhibitors.
Aug. 3, 2021 International Search Report issued in International Patent Application No. PCT/CN2021/090916.
Aug. 3, 2021 Written Opinion of the International Searching Authority issued in International Patent Application No. PCT/CN2021/090916.
Ji-Young Park et al.—"Tanshinones as selective and slow-binding inhibitors for SARS-CoV cysteine proteases" Bioorganic & Medicinal Chemistry, vol. 20, No. 19, p. 5930 , (Aug. 2, 2012).
Yingying Zhang, Research progress on the relationship between Survivin and lung diseases, Journal of Military Surgeon in Southwest China. vol. 18, No. 5, 464-467,(Sep. 15, 2016).
Liu Weirong et al., Research Progress of Avian Infectious Bronchitis Virus Papain, Heilongjiang Animal Husbandry and Veterinary Medicine. 2020(07):49-53 , (Apr. 10, 2020).
van der Hoek, L., et al.—Identification of a new human coronavirus. Nat Med, vol. 10, No. 4, 368-373,(2004).
Stadler, K., et al.—SARS beginning to understand a new virus. Nat Rev Microbiol, vol. 1. 209-218,(2003).
de Wit, E., et al.—SARS and MERS: recent insights into emerging coronaviruses. Nat Rev Microbiol, vol. 14. 523-534, (2016).
Jeannette Guarner, MD—Three Emerging Coronaviruses in Two Decades: The story of SARS, MERS, and Now COVID-19, American Journal of Clinical Pathology, aqaa029,420-421, (2020).
Akimkin V, Beer M, Blome S, et al.—New Chimeric Porcine Coronavirus in Swine Feces, Germany, 2012. Emerg Infect Dis. 22(7):1314-1315,(2016).
Ziebuhr, J., et al.—Virus-encoded proteinases and proteolytic processing in the Nidovirales. J Gen Virol 81, 853-79 (2000).
Ziebuhr, J.—Molecular biology of severe acute respiratory syndrome coronavirus. Curr Opin Microbiol, 7,412-9,(2004).
Ratia, Kiira, et al. Severe acute respiratory syndrome coronavirus papain-like protease: structure of a viral deubiquitinating enzyme. Proceedings of the National Academy of Sciences 103.15:5717-5722,(2006).
Garg, Himani, et al. "Survivin: a unique target for tumor therapy." Cancer cell international 16.1:49, (2016).
Nakahara, Takahito, et al.—"YM155, a novel small-molecule survivin suppressant, includes regression of established human hormone-refractory prostate tumor xenografts." Cancer research 67.17:8014-0921,(2007).
Satoh, Taroh, et al.—"Phase I study of YM155, a novel survivin suppressant, in patients with advanced solid tumors." Clinical Cancer Research 15.11:3872-3880,(2009).
Nizamutdinova, Irina Tsoy, et al.—"Tanshinone I suppresses growth and invasion of human breast cancer cells, MDA-MB-231, through regulation of adhesion molecules." Carcinogenesis 29.10: 1885-1892,(2008).
Shin, Dae-Seop, et al.—"Cryptotanshinone inhibits constitutive signal transducer and activator of transcription 3 function through blocking the dimerization in DU145 prostate cancer cells." Cancer research 69.1: 193-202, (2009).
Jin, Dao-Zhong, et al.—"Cryptotanshinone inhibits cyclooxygenase-2 enzyme activity but not its expression." European journal of pharmacology 549.1-3: 166-172, (2006).
Berge et al., "Pharmaceutical salts", Journal of Pharmaceutical Science 66: 1-19 (1977).
P. Heinrich Stahl and Camille G. Wermuth-Handbook of Pharmaceutical Salts: Properties, Selection, and Use, vol. 10, No. 4, p. 20, (2002).
Ratia, K. et al.—A noncovalent class of papain-like protease/deubiquitinase inhibitors blocks SARS virus replication. Proceedings of the National Academy of Sciences 105, 16119-16124,(2008).
Jin, Z., Du, X., Xu, Y. et al.—Structure of Mpro from SARS-CoV-2 and discovery of its inhibitors. Nature, vol. 582, 289-293, (2020).
Lee, H., et al.—"Identification and design of novel small molecule inhibitors against MERS-CoV papain-like protease via high-throughput screening and molecular modeling." Bioorganic & medicinal chemistry 27(10): 1981-1989, (2019).

* cited by examiner

COMPOUND FOR TREATING AND/OR PREVENTING DISEASES CAUSED BY CORONAVIRUS AND USE THEREOF

SEQUENCE LISTING

This application contains references to amino acid sequences and/or nucleic acid sequences which have been submitted concurrently herewith as the sequence listing text file entitled "000152usnp_SequenceLisitng.TXT", file size 565 Bytes (B), created on May 22, 2023. The aforementioned sequence listing is hereby incorporated by reference in its entirety pursuant to 37 C.F.R. § 1.52(e)(5).

CROSS-REFERENCE TO RELATED APPLICATIONS

The present application is a U.S. National Phase Application under 35 U.S.C. 371 of International Application No. PCT/CN2021/090916, filed on Apr. 29, 2021, which claims the benefit of the Chinese patent application CN202010418069.1 filed on May 18, 2020, and the PCT patent application PCT/CN2020/090534 filed on May 15, 2020. The entire disclosures of the above applications are incorporated herein by reference in their entireties.

TECHNICAL FIELD

The present disclosure belongs to the technical field of biomedical engineering, and particularly relates to a compound for treating and/or preventing diseases caused by coronavirus and use thereof.

BACKGROUND

Coronavirus is a class of virus closely related to humans and animals. Coronavirus HCoV-229E and HCoV-OC43 cause the common cold (van der Hoek, L., Pyrc, K., Jebbink, M. et al. *Identification of a new human coronavirus. Nat Med* 2004,10,368373). Severe acute respiratory syndrome (SARS) caused by the SARS coronavirus between 2002 and 2003 caused 8,098 infections and 774 deaths, with a fatality rate of 10% worldwide (Stadler, K., Masignani, V, Eickmann, M. et al. *SARS—beginning to understand a new virus. Nat Rev Microbiol* 2003, 1, 209-218). HCoVNL63, identified in 2004, also causes cold-like respiratory diseases (van der Hoek, L., Pyrc, K., Jebbink, M. et al. *Identification of a new human coronavirus. Nat Med* 2004,10,368373). Middle East respiratory syndrome coronavirus (MERS-CoV) emerged in 2012, causing 1,728 infections and 624 deaths in 27 countries as of Apr. 26, 2016 (de Wit, E., van Doremalen, N., Falzarano, D. et al. *SARS and MERS: recent insights into emerging coronaviruses. Nat Rev Microbiol* 2016,14, 523-534). The recent global epidemic of novel coronavirus (SARS-CoV-2) may cause novel coronavirus (COVID-19), with clinical manifestations of fever, dry cough and dyspnea, and severe symptom may cause death (Jeannette Guarner, MD, *three emerging coronaviruses in two decades: The Story of SARS, MERS, and Now COVID-19, American Journal of Clinical Pathology*, aqaa029). Coronavirus also have a huge impact on the animal husbandry: porcine epidemic diarrhea virus (PEDV), transmissible gastroenteritis virus (TGEV), and porcine delta coronavirus (PDCoV, also known as delta virus), which can cause severe enteritis, diarrhea, emesis and dehydration in pigs and bring huge losses to pig industry (Akimkin V, Beer M, Blome S, et al. *New Chimeric Porcine Coronavirus in Swine Feces, Germany*, 2012. *Emerg Infect Dis*. 2016,22(7):1314-1315.). Feline infectious peritonitis virus (FIPV) may cause fatal disease in cats. Infectious bronchitis virus (IBV), which infects poultry, is a widespread poultry disease that has a dramatic impact on poultry industry.

The genome of the coronavirus is a single-stranded positive-sense RNA with a length of about 28 kb, which mainly encodes structural proteins required for viral packaging and non-structural proteins related to replication and transcription. The development of drugs and vaccines for the treatment of coronavirus-related diseases mainly targets the above-mentioned two types of proteins. Two-thirds of the genes in the virus genome mainly encode non-structural proteins, which are used to participate in the virus replication process. Coronavirus encode two replicase polypeptides, pp1a and pp1ab, before the production of mature nonstructural proteins. Pp1a and pp1ab are cleaved into 16 non-structural proteins (nsp1-16) by two proteases encoded by the virus itself, namely main protease and papain-like protease, and only when these functional subunits are correctly cleaved into independent protein units by the protease and then assembled into a replication transcriptional complex, can the virus complete normal transcription and replication functions.

The papain-like protease is located in the non-structural protein nsp3, and is responsible for cleaving three cleavage sites at the N-terminus of the replicase polypeptide during the cleavage process, thereby releasing nspl, nsp2 and nsp3 (Ziebuhr, J.; Snijder, E. J.; Gorbalenya, A. E. *Virus-encoded proteinases and proteolytic processing in the Nidovirales. J Gen Virol* 2000, 81, 853-79.; Ziebuhr, J. *Molecular biology of severe acute respiratory syndrome coronavirus. Curr Opin Microbiol* 2004, 7, 412-9.; Ratia, Kiira, et al. *Severe acute respiratory syndrome coronavirus papain-like protease: structure of a viral deubiquitinating enzyme. Proceedings of the National Academy of Sciences* 103.15 (2006): 5717-5722.). Because papain-like protease has important functions such as enzyme digestion, deubiquitination, and antagonism of host IFN, it plays a key regulatory role in the process of virus transcription and replication, and thus becomes an important coronavirus drug target. Therefore, it is necessary to find inhibitors with strong specificity and high safety for papain-like protease catalytic sites for drug development. Inhibitors of coronavirus papain-like protease, especially small-molecule compounds targeting its substrate-binding pocket, may become potential drugs for the treatment of coronaviruses. Sepantronium Bromide (YM155, molecular formula: $C_{20}H_{19}BrN_4O_3$, CAS No: 781661-94-7), the structural formula is as follows:

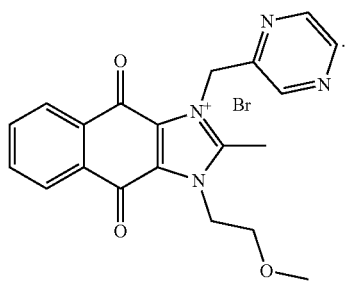 [SMILES: COCCn1c2c([n+](Cc3cnccn3)c1C)C(=O)c1ccccc1C2=O ; Br]

YM155 is a new small molecule survivin inhibitor.

Survivin is a member of the IAP (Inhibitors of apoptosis) family that inhibits apoptosis and regulates the cell cycle. Normally, survivin is expressed during embryonic development stage and stops in terminally differentiated cells and tissues. However, in many tumors, the expression of survivin is upregulated, leading to the inhibition of tumor cells apoptosis, thus reducing the death of tumor cells and producing certain resistance to chemotherapy. Therefore, survivin has become an important target for cancer therapeutics development (Garg, Himani, et al. "*Survivin: a unique target for tumor therapy.*" Cancer cell international 16.1 (2016): 49.).

According to the research, YM155 can inhibit the expression of survivin, thus inhibiting the growth and proliferation of tumor cells and causing tumor cells apoptosis. At a concentration of 10 nM, YM155 may cause apoptosis of PC-3, PPC-1 human HRPC cell line (prostate cancer cell line) (Nakahara, Takahito, et al. "*YM155, a novel small-molecule survivin suppressant, induces regression of established human.) hormone-refractory prostate tumor xenografts.*" Cancer research 67.17 (2007): 8014-8021.).

Although YM155 has a significant killing effect on tumor cells, YM155 is relatively safe for normal cell tissue. In the Phase I clinical trial of YM155 (Satoh, Taroh, et al. "*Phase I study of YM155, a novel survivin suppressant, in patients with advanced solid tumors.*" Clinical Cancer Research 15.11 (2009): 3872-3880.), the MTD (maximum tolerated dose) of YM155 is 8.0 mg/m²/d, indicating that YM155 has a certain potential for clinical development.

Tanshinone I (molecular formula: $C_{18}H_{12}O_3$, CAS No: 568-73-0) is a chemical molecule extracted from the Chinese herbal medicine *Salvia* miltiorrhiza Bunge, with the molecular formula as follows:

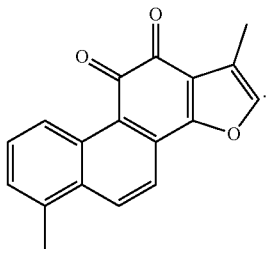 [SMILES: Cc1coc2c1C(=O)C(=O)c1c-2ccc2c(C)cccc12]

Tanzanone I has an anti-inflammatory effect and can regulate or inhibit the breast cancer metastasis by modulating adhesion molecules (Nizamutdinova, Irina Tsoy, et al. "Tanshinone I suppresses growth and invasion of human breast cancer cells, MDA-MB-231, through regulation.) of adhesion molecules." Carcinogenesis 29.10 (2008): 1885-1892). CN102552236A discloses the use of tanshinone I for the treatment of microglia-mediated diseases, and CN102988370A also discloses the use of tanshinone I in the manufacture of a medicine for the treatment of psoriasis.

Cryptotanshinone (molecular formula: $C_{19}H_{20}O_3$, CAS No: 35825-57-1) is a diterpene quinone isolated from Chinese herbal medicine *Salvia* miltiorrhiza Bunge, with the molecular formula as follows:

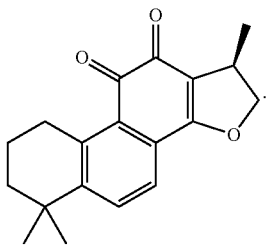 [SMILES: C[C@H]1COC2=C1C(=O)C(=O)c1c2ccc2c1CCCC2(C)C]

Studies have shown that the drug target of cryptotanshinone is STAT3, which can effectively inhibit STAT3. Cryptotanshinone can rapidly inhibit the phosphorylation of Tyr at 705 site of STAT3 through JAK2-independent mechanism. Cryptotanshinone blocks STAT3 dimerization by binding to monomeric STAT3 and ultimately inhibits the transcriptional regulatory activity of STAT3 (Shin, Dae-Seop, et al. "Cryptotanshinone inhibits constitutive signal transducer and activator of transcription 3 function through blocking the dimerization in DU145 prostate cancer cells." Cancer research 69.1 (2009): 193-202). In addition, studies have reported that cryptotanshinone may exert anti-inflammatory effects by inhibiting the activity of cyclooxygen II (Jin, Dao-Zhong, et al. "Cryptotanshinone inhibits cyclooxygenase-2 enzyme activity but not its expression." European journal of pharmacology 549.1-3 (2006): 166-172). CN106798737A also discloses the effect of cryptotanshinone in the prevention and treatment of pulmonary fibrosis. JP2004517939A also discloses the effect of cryptotanshinone in the prevention and treatment of early Alzheimer's disease.

In the prior art, none of the above drugs can be used for treating diseases related to coronavirus.

CONTENT OF THE PRESENT INVENTION

The technical problem to be solved in the present disclosure is to provide a compound for treating and/or preventing diseases caused by coronavirus and use thereof regarding the defect that there is no drug for effectively treating and/or preventing diseases caused by the coronavirus in the prior art, the compound specifically relates to YM155.

The technical solutions of the present disclosure are described in detail below.

The first technical solution of the present disclosure is: a compound YM155, tanshinone I or cryptotanshinone, a pharmaceutically acceptable salt thereof, a solvate thereof, a solvate of the pharmaceutically acceptable salt thereof, or a crystal form thereof; used for treating and/or preventing diseases caused by coronavirus; the CAS number of the compound YM155 is 781661-94-7, the CAS number of the tanshinone I is 568-73-0, and the CAS number of the cryptotanshinone is 35825-57-1.

The second technical solution of the present disclosure is: a compound YM155, tanshinone I or cryptotanshinone, a pharmaceutically acceptable salt thereof, a solvate thereof, a solvate of the pharmaceutically acceptable salt thereof, or a crystal form thereof, used in the manufacture of a medicament for treating and/or preventing diseases caused by coronavirus or a papain-like protease inhibitor, the medicament is used for treating and/or preventing diseases caused by coronavirus; the CAS number of the compound YM155 is 781661-94-7, the CAS number of the tanshinone I is 568-73-0, and the CAS number of the cryptotanshinone is 35825-57-1.

The third technical solution of the present disclosure is: a pharmaceutical composition comprising the compound YM155, tanshinone I or cryptotanshinone, the pharmaceutically acceptable salt thereof, the solvate thereof, the solvate of the pharmaceutically acceptable salt thereof, or the crystal form thereof as defined in the first or second technical solution.

In a preferred embodiment of the present disclosure, the pharmaceutical composition further comprises other medicaments; wherein, the other medicaments are used for treating and/or preventing diseases caused by coronavirus.

The fourth technical solution of the present disclosure is: use of a compound YM155, tanshinone I or cryptotanshinone, a pharmaceutically acceptable salt thereof, a solvate thereof, a solvate of the pharmaceutically acceptable salt thereof, a crystal form thereof, or a pharmaceutical composition comprising the same in the manufacture of a medicament for treating and/or preventing diseases caused by coronavirus or in the manufacture of a papain-like protease inhibitor; the CAS number of the compound YM155 is 781661-94-7, the CAS number of the tanshinone I is 568-73-0, and the CAS number of the cryptotanshinone is 35825-57-1.

The fifth technical solution of the present disclosure is: a method for treating diseases caused by coronavirus, comprising administering to a patient in need thereof a compound YM155, tanshinone I or cryptotanshinone, a pharmaceutically acceptable salt thereof, a solvate thereof, a solvate of the pharmaceutically acceptable salt thereof, a crystal form thereof, or a pharmaceutical composition comprising the same; the CAS number of the compound YM155 is 781661-94-7, the CAS number of the tanshinone I is 568-73-0, and the CAS number of the cryptotanshinone is 35825-57-1.

In the present disclosure, the disease is preferably the disease of mammal or avian.

In the present disclosure, the mammal preferably includes human, pig and cat.

The coronavirus described in the present disclosure is defined as well known in the art, and belongs to Nidovirales, Coronaviridae and Orthocoronavirinae in the systematic classification. Coronavirus is an RNA virus with envelope and a single-stranded positive-sense genome, and are a large class of virus widely existing in nature.

The purpose of the present disclosure is to provide a potential treatment solution for diseases caused by coronavirus infection. The coronavirus of the present disclosure preferably belongs to the Orthocoronavirinae, more preferably belongs to genus Alpha coronavirus, genus Beta coronavirus, genus Gamma coronavirus or genus Delta coronavirus.

In a preferred embodiment of the present disclosure, the compound YM155, tanshinone I or cryptotanshinone can not only be used for treating diseases caused by SARS-CoV-2 (Beta coronavirus), but also treating major infectious diseases caused by other coronaviruses such as SARS-CoV(Beta coronavirus) and MERS-CoV, and can also be used as common cold medicament for treating diseases caused by coronavirus such as HCoV-HKU1 (human coronavirus HKU; Beta coronavirus), HCoV-NL63 (human coronavirus NL63; Alpha coronavirus), HCoV-OC43(Human coronavirus OC43) and HCoV-229E (human coronavirus 22E; Alpha coronavirus) and can also be used as veterinary medicament for treating transmissible gastroenteritis virus (TGEV; Alpha coronavirus), Porcine epidemic diarrhea virus (PEDV; Alpha coronavirus), Porcine delta coronavirus (PDCoV; Delta coronavirus), Feline infectious peritonitis virus (FIPV; Alpha coronavirus), Infectious bronchitis virus (IBV; Gamma coronavirus) and other animal diseases.

Therefore, the coronavirus of the present disclosure is preferably selected from SARS-CoV-2, SARS-CoV, MERS-CoV, HCoV-HKU1, HCoV-NL63, HCoV-OC43, HCoV-229E, TGEV, PEDV, PDCoV, FIPV or IBV.

The pharmaceutical composition with the various compounds of the present disclosure as the active components in the present disclosure can be prepared according to the method known in the art. The compound of the present disclosure can be formulated in any dosage form suitable for human or animal use. The weight content of the compound of the present disclosure in the pharmaceutical composition thereof is usually 0.1 to 99.0%.

The pharmaceutically acceptable carrier can be a conventional carrier in the art, and the carrier can be any suitable physiologically or pharmaceutically acceptable pharmaceutical excipients. The pharmaceutical excipient is a conventional pharmaceutical excipient in the art, preferably including a pharmaceutically acceptable excipient, filler or diluent, etc. More preferably, the pharmaceutical composition comprises 0.01 to 99.99% of the above-mentioned protein and/or the above-mentioned antibody drug conjugate, and 0.01 to 99.99% of the pharmaceutical carrier, and the percentage is the mass percentage of the pharmaceutical composition.

The compound of the present disclosure or the pharmaceutical composition containing the same can be administered in unit dosage form, and the route of administration can be enteral or parenteral, such as oral, intravenous, intramuscular, subcutaneous, nasal, oral mucosa, eye, lung and respiratory tract, skin, vagina, rectum, etc.

The papain-like protease inhibitors described above can be present in the form of coronavirus inhibitors, for example: conventional drugs used for preventing and treating coronavirus.

Terminology Explanation

The term "pharmaceutically acceptable" refers to salts, solvents, excipients, etc. are generally non-toxic, safe, and suitable for patient use. The "patient" is preferred mammal, more preferably human.

The term "pharmaceutically acceptable salt" refers to the salt prepared by the compound of the present disclosure, the drug containing the same and pharmaceutical composition containing the same with a relatively nontoxic and pharmaceutically acceptable acid or base. When the compound of the present disclosure, the drug containing the same and pharmaceutical composition containing the same contain a relatively acidic functional group, a base addition salt can be obtained by bringing the neutral form of the drug into contact with a sufficient amount of pharmaceutically acceptable base in a pure solution or a suitable inert solvent. Pharmaceutically acceptable base addition salts include, but are not limited to, lithium, sodium, potassium, calcium, aluminum, magnesium, zinc, bismuth, ammonium, diethanolamine. When the drug of the present disclosure contains a relatively basic functional group, an acid addition salt can be obtained by bringing the neutral form of the drug into contact with a sufficient amount of pharmaceutically acceptable acid in a pure solution or a suitable inert solvent. The pharmaceutically acceptable acids include inorganic acid, including but not limited to: hydrochloric acid, hydrobromic acid, hydroiodic acid, nitric acid, carbonic acid, phosphoric acid, phosphorous acid, sulfuric acid, ect. The pharmaceutically acceptable acid includes organic acid, the organic acid includes but not limited to: acetic acid, propionic acid, oxalic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, salicylic acid, tartaric acid, methanesulfonic acid, isonicotinic acid, acid citric acid, oleic acid, tannic acid, pantothenic acid, hydrogen tartrate, ascorbic acid, gentisic acid, fumaric acid, gluconic acid, sugar acid, formic acid, ethanesulfonic acid, pamoic acid (i.e. 4,4'-methylene-bis(3-hydroxy-2-naphthoic acid), amino acids (such as glutamic acid, arginine), etc. When the drug of the present disclosure contain relatively acidic and relatively basic functional groups, they can be converted into base addition salts or acid addition salts. For details, see Berge et al., "Pharmaceutical Salts", Journal of Pharmaceutical Science 66: 1-19 (1977), or, Handbook of Pharmaceutical Salts: Properties, Selection, and Use (P. Heinrich Stahl and Camille G. Wermuth, ed., Wiley-VCH, 2002).

The term "one or more" in "more" refers to 2, 3, 4, 5, 6, 7, 8, 9 or more.

The compound of the present disclosure, the drug containing the same, or the pharmaceutical composition containing the same can be administered in unit dosage form, and the route of administration can be enteral or parenteral, such as oral, external application, intravenous, intramuscular, subcutaneous, nasal, oral mucosa, eye, lung and respiratory tract, skin, vagina, rectum, etc., preferably oral or external application.

The dosage form for administration can be a liquid dosage form, a solid dosage form or a semi-solid dosage form. The liquid dosage form can be solution (including true solution and colloidal solution), emulsion (including o/w, w/o and double emulsion), suspension, injection (including water injection, powder injection and infusion), eye drop, nasal drop, lotion and liniment, etc.; the solid dosage form can be tablet (including ordinary tablet, enteric-coated tablet, buccal tablet, dispersible tablet, chewable tablet, effervescent tablet, orally disintegrating tablet), capsule (including hard capsule, soft capsule, enteric-coated capsule), granule, powder, pellet, drop pill, suppository, film, patch, gas (powder) aerosol, spray, etc.; the semi-solid dosage form can be ointment, gel, paste, etc.

The medicament or pharmaceutical composition of the present disclosure can be made into ordinary preparation, as well as sustained-release preparation, controlled-release preparation, targeted preparation and various microparticle drug delivery system.

"Pharmaceutical composition" refers to one or more compounds in the present disclosure or pharmaceutically acceptable salts thereof, solvates thereof, hydrates thereof or prodrugs thereof and other chemical components, such as pharmaceutically acceptable carriers, mixed. The purpose of the pharmaceutical composition is to facilitate the process of drug administration to animals.

"Pharmaceutically acceptable carrier" refers to an inactive ingredient in a pharmaceutical composition that does not cause significant irritation to the organism and does not interfere with the biological activity and properties of the administered compound, such as, but not limited to: calcium carbonate, calcium phosphate, various sugars (such as lactose, mannitol, etc.), starch, cyclodextrin, stearate, cellulose, carbonate, acrylic acid polymer or methacrylic acid polymer, gel, water, polyethylene glycol, propylene glycol, ethylene glycol, EZ sesame oil or hydrogenated EZ sesame oil or polyethoxy hydrogenated EZ sesame oil, sesame oil, corn oil, peanut oil, etc.

The above-mentioned pharmaceutical composition, in addition to including pharmaceutically acceptable carrier, can also include adjuvant commonly used in pharmacology (agent), such as: antibacterial agent, antifungal agent, antimicrobial agent, preservative, toner, solubilizer, thickener, surfactant, complexant, protein, amino acid, fat, sugar, vitamin, mineral, trace element, sweetener, pigment, flavor or combination thereof.

The term "treatment" refers to therapeutic therapy. In relation to a specific disorder, treatment refers to: (1) ameliorating one or more biological manifestations of the disease or disorder, (2) interfering with (a) one or more points in the biological cascade leading to or causing the disorder or (b) one or more biological manifestations of the disorder, (3) ameliorating one or more symptoms, effects or side effects associated with the disorder, or one or more symptoms, effects or side effects associated with the disorder or its treatment, or (4) slowing the progression of the disorder or one or more biological manifestations of the disorder.

The term "solvate" refers to a substance formed by combining a compound of the present invention with a stoichiometric or non-stoichiometric solvent. Solvent molecules in solvates can exist in an ordered or unordered arrangement. The solvent includes, but is not limited to, water, methanol, ethanol, etc.

As mentioned above, the terms "pharmaceutically acceptable salts" and "solvates" in the term "solvates of pharmaceutically acceptable salts" refer to substances formed by combining the compounds of the present disclosure with 1, relatively nontoxic and pharmaceutically acceptable acid or bases or 2, with stoichiometric or non-stoichiometric solvents. The "solvate of pharmaceutically acceptable salt" includes but is not limited to hydrochloric acid monohydrate of the compound of the present disclosure.

The terms "compound", "pharmaceutically acceptable salt", "solvate" and "pharmaceutically acceptable salt solvate" can exist in a crystalline or amorphous form. The term "crystal form" means that the ions or molecules in it are arranged in a strictly periodic manner in three-dimensional space in a certain manner, and have the regularity of periodic repetition at a certain distance; due to the difference in the above-mentioned periodic manner, there can be multiple crystal forms, that is, polymorphism. The term "amorphous" means that the ions or molecules are in a disordered distribution state, that is, there is no periodic arrangement between ions and molecules.

In the present disclosure, the term "including, containing or comprising" can refer to in addition to including the components listed later, other components also exist; it can also mean "consisting of . . . ", that is, it only includes the components listed later and there is no other ingredients.

The positive progressive effect of the present disclosure is:

Through the enzyme activity experiment in vitro and the in vitro cell virus experiment, the present disclosure unexpectedly found that YM155 can be used for treating the related diseases caused by coronavirus. At present, there is no approved specific drug for human coronavirus, and the YM155 treatment regimen can fill the gapin the prior art, with strong antiviral activity and low toxic side effects.

DETAILED DESCRIPTION OF THE PREFERRED EMBODIMENT

The present disclosure is further described below in conjunction with the embodiments.

Tanshinone I (CAS number: 568-73-0) was purchased from the Approved Drug Library (Target Mol) and cryptotanshione (CAS number: 35825-57-1) was purchased from the Natural Product Library (Selleck).

The positive control is a GRL-0617 inhibitor (purchased from RayStar Bio) and is known to be effective in inhibiting coronavirus papain-like protease (specifically see Ratia, K. et al. A noncovalent class of papain-like protease/deubiquitinase inhibitors blocks SARS virus replication. Proceedings of the National Academy of Sciences 105, 16119-16124 (2008)), the structural formula is as follows:

Embodiment 1

Figure 1:
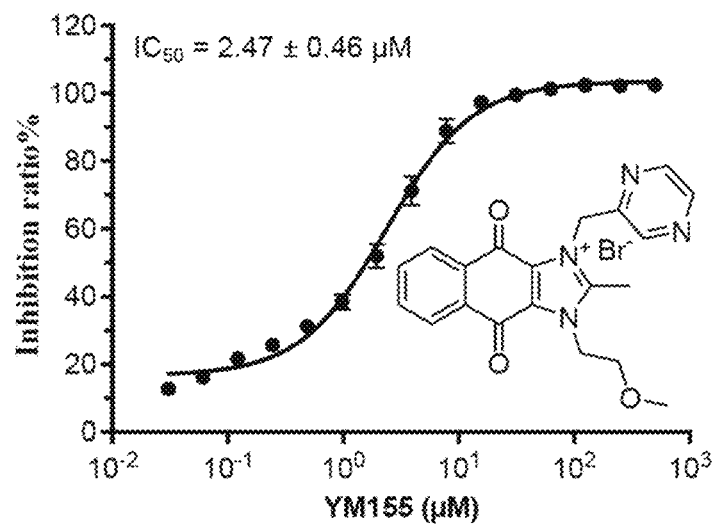
FIG. 1 shows that YM155 has strong inhibitory activity on novel coronavirus papain-like protease ($IC_{50}$=2.47 µM).

In vitro enzyme activity experiments showed that YM155 could significantly inhibit the papain-like protease activity of novel coronavirus (SARS-CoV-2) (FIG. 1).

In vitro enzyme activity experiment steps: final concentration of 200 nM of SARS-CoV-2 papain-like protease, YM155 solution with different concentration gradients (0.1 nm to 5 μm) and 20 μM fluorescent substrate (Arg-Leu-Arg-Gly-Gly-AMC) (SEQ ID NO: 1) were added into 60 μL reaction system (50 mM HEPES, pH=7.5, 0.1 mg ml-1 BSA), the mixture was incubated at room temperature for 10 min, the initial reaction rate of fluorescent substrate was detected with emission light of 340 nm and excitation light of 460 nm, and compared with the initial rate of the control group without drugs, the inhibition rate curve was obtained. The experiment was biologically repeated three times.

Embodiment 2

Figure 2:
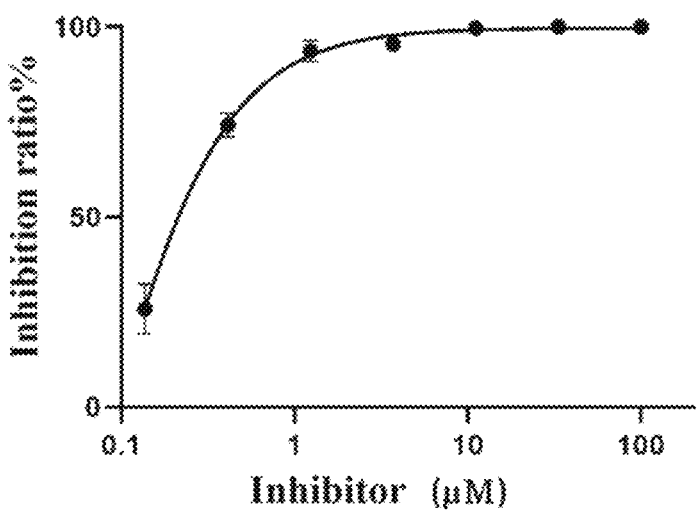
FIG. 2 shows thatYM155 can inhibit the replication of SARS-CoV-2 in cells ($EC_{50}$=0.17 µM).
Figure 3:
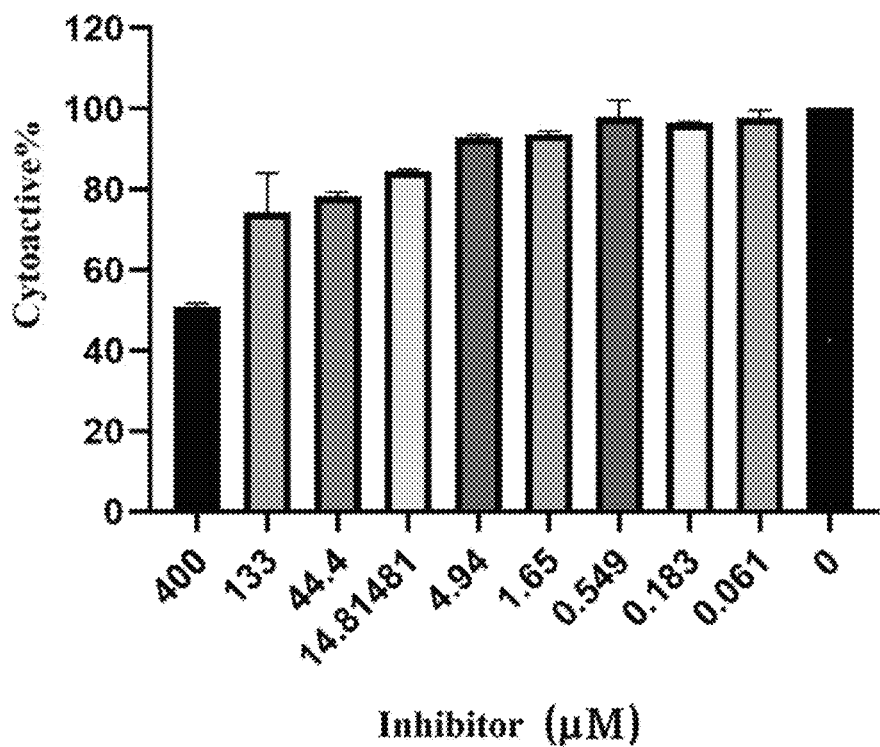
FIG. 3 shows that YM155 has low cytotoxicity ($CC_{50}$>133 µM).

Through in vitro cell virus experiment, it was found that YM155 could significantly inhibit the replication capacity of SARS-CoV-2 in cells (FIG. 2). At the same time, in vitro cytotoxicity assay (FIG. 3) and clinical Phase I trial reported in the literature (Satoh, Taroh, et al. "Phase I study of YM155, a novel survivin suppressant, in patients with advanced solid tumors." Clinical Cancer Research 15.11 (2009): 3872-3880.), confirmed that YM155 had high safety, so YM155 could be used for treating related diseases caused by coronavirus.

The detailed experimental methods of in vitro cell virus experiments were as follows:

1) In the plaque phagocytosis antiviral test, the Vero E6 cells (purchased from ATCC) plated in 24-well culture dishes were pretreated with YM155 at different concentrations (0.1 μM to 10 μM) for 1 hour, and clinically isolated virus strain SARS-CoV-2 (nCoV-2019Beta-CoV/Wuhan/WIV04/2019) (MOI=0.05)was added, and the cells were infected for 1 hour. Then, the virus-drug mixture was removed, and after the cells were washed twice with DMEM medium, new medium containing the pretreated drug at the corresponding concentration and 0.9% agarose was re-added. After cultured for 4 days, the cells were fixed with 4% paraformaldehyde for 30 minutes, stained with crystal violet, observed and counted. All virus tests were finished in a biosafety level 3 laboratory and all the experiments were biologically repeated three times.

2) In cell viability experiments, Vero E6 cells were cultured in 96-well plates. One day later, YM155 with different concentrations (0.06 μM to 400 μM) was added to DMEM medium for one day, and then the relative number of surviving cells was measured by CCK8 assay to obtain the cell viability data. All the experiments were biologically repeated three times.

Detailed experimental methods for in vitro enzyme activation experiments and in vitro cell virus experiments could be found in Jin, Z., Du, X., Xu, Y et al. Structure of Mpro from SARS-CoV-2 and discovery of its inhibitors. Nature, doi:10.1038/s41586-020-2223-y (2020).

Embodiment 3

The experimental conditions of enzyme activity in vitro were as follows:

The fluorescence substrate of enzyme activity experiment: Z-Arg-Leu-Arg-Gly-Gly-AMC (SEQ ID NO: 1) (purchased from Gill Biochemical), with the excitation and emission wavelengths of 340 nm and 460 nm, respectively.

The enzyme activity reaction buffer used in the experimental steps was 50 mM HEPES, pH 7.5, 0.1 mg/mL BSA, 2 mM DTT; the enzyme activity reaction temperature: 30° C.

The specific experimental steps were as follows: papain-like protease was added at the beginning of the reaction, the final concentration of papain-like protease was 0.2 μM, 50 μM of inhibitor solution (tanshinone I and cryptotanshinone) and fluorescent substrate of enzyme activity experiment (Arg-Leu-Arg-Gly-Gly-AMC (SEQ ID NO: 1), concentration of 20 μM) were added into 60 μL reaction system (50 mm HEPES, pH=7.5, 0.1 mg/mL BSA), the mixture was incubated at room temperature for 10 min, the initial reaction rate of fluorescent substrate was detected with emission light of 340 nm and excitation light of 460 nm, and compared with the initial rate of the control group without drugs, the inhibition rate curve was obtained. The experiment was biologically repeat three times (for specific steps, see Lee, H., et al. (2019). "Identification and design of novel small molecule inhibitors against MERS-CoV papain-like protease via high-throughput screening and molecular modeling. "Bioorganic & medicinal chemistry 27(10):1981-1989., Jin, Z., Du, X., Xu, Y et al. *Structure of Mprofrom SARS-CoV-2 and discovery of its inhibitors. Nature*, doi:10.1038/s41586-020-2223-y (2020)).

Figure 4:
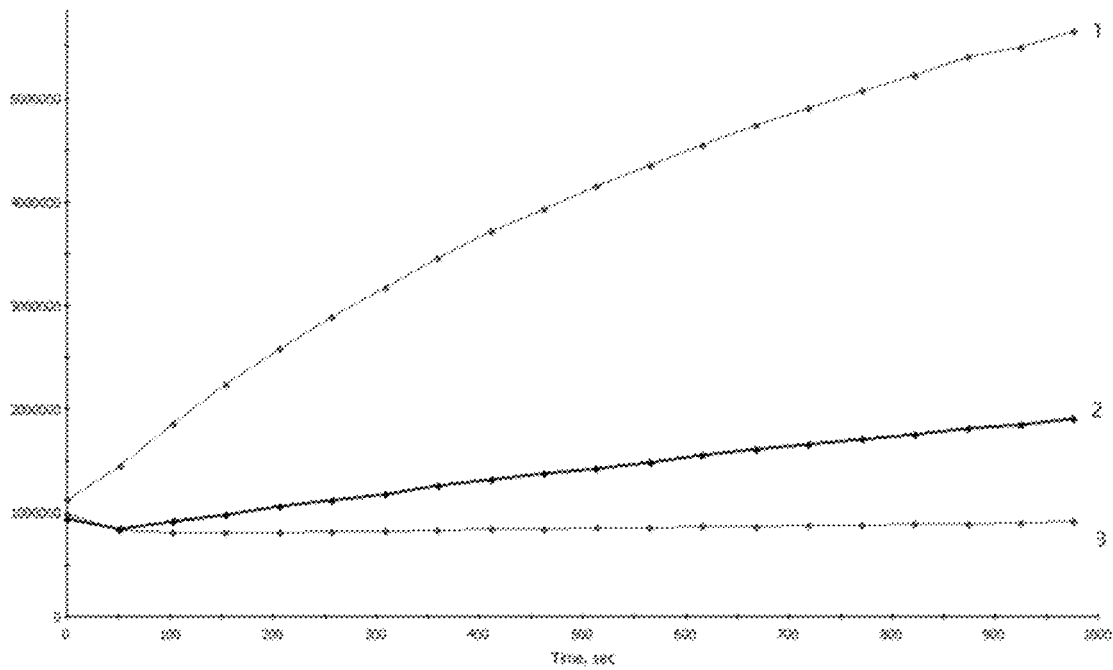
FIG. 4 shows that the inhibitory activity of tanshinone I on novel coronavirus papain-like protease; 1: DMSO (negative control), 2: compound molecule; 3: positive control (GRL-0617).
Figure 5:
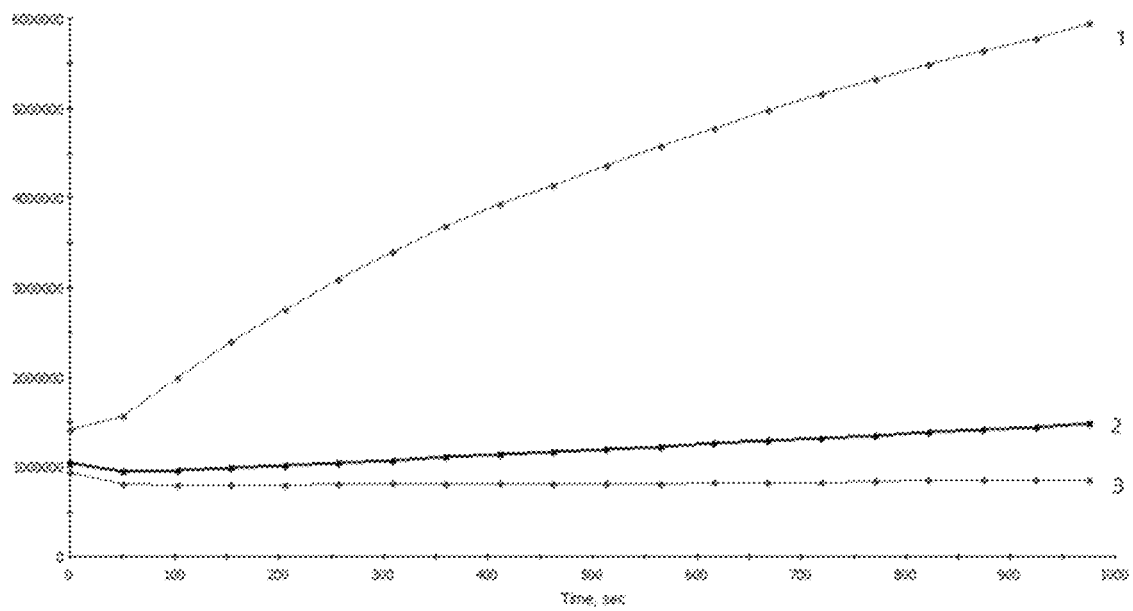
FIG. 5 shows that the inhibitory activity of cryptotanshinone on novel coronavirus papain-like protease 1: DMSO (negative control), 2: compound molecule; 3: positive control (GRL-0617).

The obtained results were shown in FIG. 4 and FIG. 5, which showed the enzyme activity experiment curves for tanshinone I and cryptotanshinone. Experiments showed that tanshinone I and cryptotanshinone could significantly inhibit the papain-like protease activity of novel coronavirus (SARS-CoV-2), which was significantly different from the negative control, both two compounds had significant inhibitory activity against the coronavirus papain-like protease.

Embodiment 4

In vitro enzyme activity experiments showed that tanshinone I and cryptotanshinone could significantly inhibit the papain-like protease activity of novel coronavirus (SARS-CoV-2) (FIG. 4).

In vitro enzyme activity experiment steps: final concentration of 200 nM of SARS-CoV-2 papain-like protease, inhibitor solution with different concentration gradients and 20 μM fluorescent substrate (Arg-Leu-Arg-Gly-Gly-AMC) (SEQ ID NO: 1) were added into 60 μL reaction system (50 mM HEPES, pH=7.5, 0.1 mg mi-1 BSA), the mixture was incubated at room temperature for 10 min, the initial reaction rate of fluorescent substrate was detected with emission light of 340 nm and excitation light of 460 nm, and compared with the initial rate of the control group without drugs, the inhibition rate curve was obtained. The experiment was biologically repeated three times.

strain SARS-CoV-2 (nCoV-2019BetaCoV/Wuhan/WIV04/2019) (MOI=0.05) were added, and the cells were infected for 1 hour. Then, the virus-drug mixture was removed, and after the cells were washed twice with DMEM medium, new medium containing the pretreated drug at the corresponding concentration and 0.9% agarose was re-added. After cultured for 4 days, the cells were fixed with 4% paraformaldehyde for 30 minutes, stained with crystal violet, observed and counted. All virus tests were finished in a biosafety level 3 laboratory and all the experiments were biologically repeated three times.

(2) In cell viability experiments, Vero E6 cells were cultured in 96-well plates. One day later, inhibitor with different concentrations was added to DMEM medium for one day, and then the relative number of surviving cells was measured by CCK8 assay to obtain the cell viability data. All the experiments were biologically repeated three times in biology.

Detailed experimental methods for in vitro enzyme activation experiments and in vitro cell virus experiments could be found in Jin, Z., Du, X., Xu, Y et al. *Structure of Mpro from SARS-CoV-2 and discovery of its inhibitors. Nature*, doi:10.1038/s41586-020-2223-y (2020).

Although the specific embodiments of the present disclosure have been described above, those skilled in the art should understand that these are only examples, and various changes or modifications can be made to these embodiments without departing from the principle and essence of the present disclosure. Accordingly, the scope of protection of the present disclosure is defined by the claims.

SEQUENCE LISTING

```
<160> NUMBER OF SEQ ID NOS: 1

<210> SEQ ID NO 1
<211> LENGTH: 5
<212> TYPE: PRT
<213> ORGANISM: Artificial Sequence
<220> FEATURE:
<223> OTHER INFORMATION: fluorescent substrate

<400> SEQUENCE: 1

Arg Leu Arg Gly Gly
1               5
```

Figure 6:
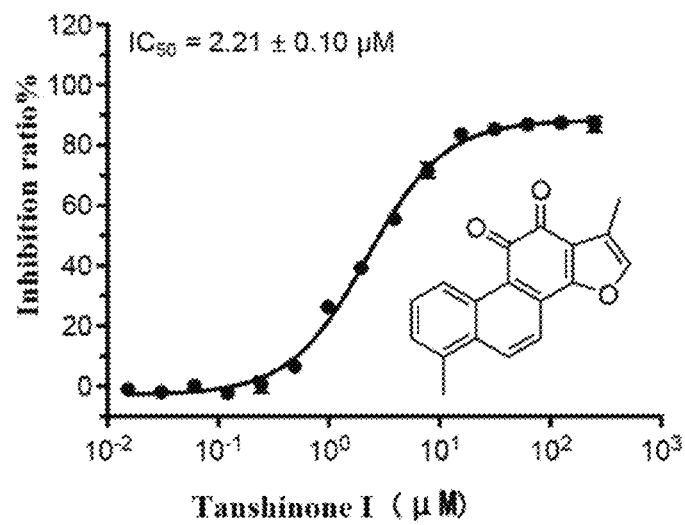
FIG. 6 shows that tanshinone I has strong inhibitory activity on novel coronavirus papain-like protease ($IC_{50}$=2.21 µM).
Figure 8:
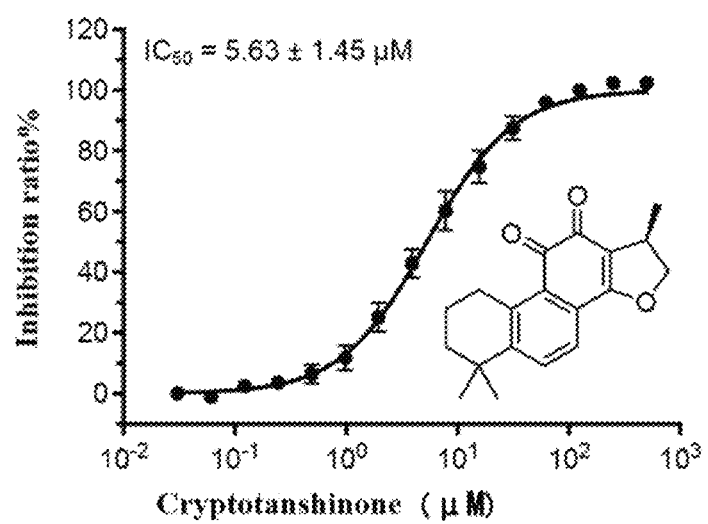
FIG. 8 shows that cryptotanshinone has strong inhibitory activity on novel coronavirus papain-like protease ($IC_{50}$=5.63 μM).

The obtained results were shown in FIG. 6 and FIG. 8, respectively, tanshinone I and cryptotanshinone had strong inhibitory activity against the novel coronavirus papain-like protease with $IC_{50}$ of 2.21 M and 5.63 M, respectively.

Embodiment 5

Figure 7:
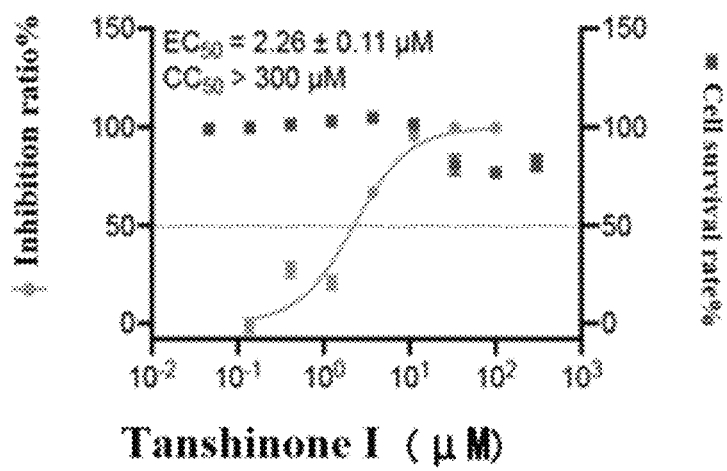
FIG. 7 shows that tanshinone I can inhibit the replication of SARS-CoV-2 in cells ($EC_{50}$=2.26 μM) with low cytotoxicity ($CC_{50}$>300 μM).
Figure 9:
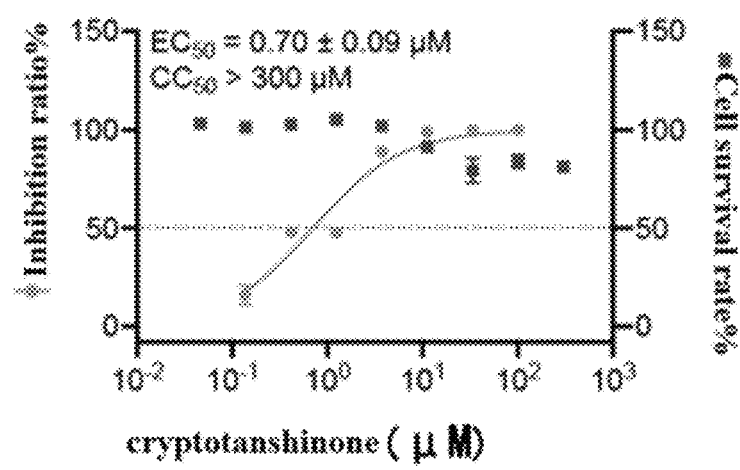
FIG. 9 shows that cryptotanshinone can inhibit the replication of SARS-CoV-2 in cells ($EC_{50}$=0.7 μM) with low cytotoxicity ($CC_{50}$>300 μM).

Through in vitro cell virus experiment, it was found that tanshinone I and cryptotanshinone could significantly inhibit the replication capacity of SARS-CoV-2 in cells with low cytotoxicity. $EC_{50}$ values were 2.26 μM and 0.7 μM, respectively (see FIGS. 7 and 9). The $CC_{50}$ values were all greater than 300 μM.

The detailed experimental methods of in vitro cell virus experiments were as follows:

(1) In the plaque phagocytosis antiviral test, the Vero E6 cells (purchased from ATCC) plated in 24-well culture dishes were pretreated with inhibitor at different concentrations for 1 hour, and clinically isolated virus

The invention claimed is:

1. A method for treating or preventing diseases caused by coronavirus, comprising administering to a patient in need thereof a compound YM155, or a pharmaceutically acceptable salt thereof, a solvate thereof, a solvate of the pharmaceutically acceptable salt thereof, or a crystal form thereof; the CAS number of the compound YM155 is 781661-94-7.

2. The method as claimed in claim 1, wherein,
the disease is the disease of mammal or avian;
or, the coronavirus belongs to the Orthocoronavirinae.

3. The method as claimed in claim 1, wherein,
the coronavirus is selected from one or more than one of coronavirus causing upper respiratory tract infection, virus causing acute respiratory syndromes.

4. The method as claimed in claim 1, wherein,
the coronavirus is selected from one or more than one of transmissible gastroenteritis virus, porcine epidemic diarrhea virus, porcine delta coronavirus, feline infectious peritonitis virus and avian infectious bronchitis virus.

5. The method as claimed in claim 2, wherein,
the mammal includes human, pig, and cat;
or, the coronavirus belongs to genus Alpha coronavirus, genus Beta coronavirus, genus Gamma coronavirus or genus Delta coronavirus.

6. The method as claimed in claim 5, wherein,
the coronavirus is selected from SARS-CoV-2, SARS-CoV, MERS-CoV, HCoV-HKU1, HCoV-NL63, HCoV-OC43, HCoV-229E, TGEV, PEDV, PDCoV, FIPV and IBV.

7. The method as claimed in claim 3, wherein,
the coronavirus is selected from one or more than one of SARS-associated coronavirus and Middle East respiratory syndrome coronavirus.

8. The method as claimed in claim 7, wherein,
the coronavirus causing the upper respiratory tract infection is selected from one or more than one of human coronavirus 229E, human coronavirus HKU1, human coronavirus OC43, human coronavirus NL63 and mouse hepatitis virus A59;
or, the SARS-associated coronavirus is SARS-CoV or SARS-CoV-2.

* * * * *